(12) United States Patent
Katz (10) Patent No.: US 9,699,689 B2
(45) Date of Patent: Jul. 4, 2017

(54) COMMUNICATION OF PLAIN INFORMATION DURING CHANNEL ACCESS

(71) Applicant: Daniel A. Katz, Kiryat Ono (IL)

(72) Inventor: Daniel A. Katz, Kiryat Ono (IL)

(73) Assignee: Daniel A. Katz, Kiryat Ono (IL)

( * ) Notice: Subject to any disclaimer, the term of this patent is extended or adjusted under 35 U.S.C. 154(b) by 182 days.

(21) Appl. No.: 14/056,979

(22) Filed: Oct. 18, 2013

(65) Prior Publication Data

US 2015/0110004 A1   Apr. 23, 2015

(51) Int. Cl.
| | | |
|---|---|---|
| H04W 28/04 | (2009.01) | |
| H04W 28/18 | (2009.01) | |
| H04L 1/00 | (2006.01) | |
| H04W 74/00 | (2009.01) | |
| H04W 84/10 | (2009.01) | |

(52) U.S. Cl.
CPC .......... H04W 28/18 (2013.01); H04L 1/0079 (2013.01); H04W 74/00 (2013.01); H04W 84/10 (2013.01)

(58) Field of Classification Search
CPC ...... H04L 27/06; H04L 25/493; H04W 74/00; H04W 74/002
USPC .......... 370/329–350; 375/239, 142, 343, 340
See application file for complete search history.

(56) References Cited

U.S. PATENT DOCUMENTS

| | | | | | |
|---|---|---|---|---|---|
| 6,094,562 | A * | 7/2000 | Zhong | .......... | H04B 7/2662 370/519 |
| 7,058,422 | B2 * | 6/2006 | Learned | .......... | H04L 25/0328 375/341 |
| 2002/0037737 | A1 * | 3/2002 | Learned | .......... | H04L 25/0328 455/526 |
| 2003/0198308 | A1 * | 10/2003 | Hoctor | .......... | H04B 1/7183 375/354 |
| 2003/0206538 | A1 * | 11/2003 | Rezaiifar | .......... | H04L 9/12 370/335 |
| 2005/0031021 | A1 * | 2/2005 | Baker | .......... | H04B 1/71637 375/142 |
| 2005/0053165 | A1 * | 3/2005 | Lakkis | .......... | H04B 1/71637 375/260 |
| 2005/0063424 | A1 * | 3/2005 | Weinstein | .......... | H04H 20/69 370/535 |
| 2006/0030267 | A1 * | 2/2006 | Bhardwaj | .......... | H04B 1/109 455/63.1 |
| 2006/0055485 | A1 * | 3/2006 | Lobeek | .......... | H03H 9/706 333/133 |
| 2007/0286107 | A1 * | 12/2007 | Singh | .......... | H04N 21/43615 370/312 |
| 2008/0112512 | A1 * | 5/2008 | Ekbal | .......... | H04B 1/7176 375/340 |
| 2010/0319037 | A1 * | 12/2010 | Kim | .......... | H04N 21/2383 725/81 |
| 2010/0329384 | A1 * | 12/2010 | Kwak | .......... | H04L 5/0007 375/295 |

(Continued)

Primary Examiner — Andrew Chriss
Assistant Examiner — Rasha Fayed (57) ABSTRACT

A method for communication of plain information during channel access, according to a pre-defined channel access scheme, such as TDMA or FDMA or CDMA, by slightly modulating in a transmitter a parameter related to the channel access, such as time of transmission or frequency of transmission, using this modulation to encode plain information, while keeping the channel and the compatible receiver tolerant to this slight modulation.

20 Claims, 5 Drawing Sheets

(56) References Cited

U.S. PATENT DOCUMENTS

| | | | |
|---|---|---|---|
| 2011/0149879 A1* | 6/2011 | Noriega | H04W 72/1236 370/329 |
| 2012/0182867 A1* | 7/2012 | Farrag | H04W 28/0236 370/230 |
| 2012/0188958 A1* | 7/2012 | Suzuki | H04W 74/006 370/329 |
| 2012/0249887 A1* | 10/2012 | Hr | H04N 5/455 348/726 |
| 2013/0021932 A1* | 1/2013 | Damnjanovic | H04W 52/0229 370/252 |
| 2014/0056220 A1* | 2/2014 | Poitaul | H04W 40/246 370/328 |
| 2015/0003414 A1* | 1/2015 | Campos | H04W 16/14 370/331 |

* cited by examiner

Fig. 1 – Present Invention in TDMA Scheme - transmission time

1a. Nominal transmission start time

1b. Encoding table

| plain information | transmission start time modulation [msec] |
|---|---|
| 000 | -1 |
| 001 | -2 |
| 010 | -3 |
| 011 | -4 |
| 100 | +1 |
| 101 | +2 |
| 110 | +3 |
| 111 | +4 |

1c. Transmission start time modulated by plain information [not in scale]

Fig. 2 – Present Invention in TDMA Scheme - time difference

2a. Nominal time repetition period

2b. Encoding table

| plain information | repetition period modulation [msec] |
|---|---|
| 000 | -1 |
| 001 | -2 |
| 010 | -3 |
| 011 | -4 |
| 100 | +1 |
| 101 | +2 |
| 110 | +3 |
| 111 | +4 |

2c. Repetition period modulated by plain information [not in scale]

Fig. 3 – Present Invention in FDMA Scheme

3a. Nominal center frequency

3b. Encoding table

| plain information | center frequency modulation [KHz] |
|---|---|
| 000 | -1 |
| 001 | -2 |
| 010 | -3 |
| 011 | -4 |
| 100 | +1 |
| 101 | +2 |
| 110 | +3 |
| 111 | +4 |

3c. Center frequency modulated by plain information [not in scale]

Fig. 4 – Transmitting Device Block Diagram

Fig. 5 – Receiver Block Diagram

COMMUNICATION OF PLAIN INFORMATION DURING CHANNEL ACCESS

BACKGROUND OF THE INVENTION

The present invention relates to the art of communications, particularly wireless communications.

In telecommunications and computer networks, a channel access method or multiple access method allows several users or terminals connected to the same channel or transmission medium to transmit over it and to share its capacity. Examples of shared physical media are wireless networks, bus networks, ring networks, star networks and half-duplex point-to-point links.

A channel-access scheme is based on a multiplexing method that allows several data streams or signals to share the same communication channel or physical medium. In the art, four basic methods for channel multiple access are known: Time Division Multiple Access (TDMA), Frequency Division Multiple Access (FDMA), Code Division Multiple Access (CDMA), Space Division Multiple Access (SDMA). In practice, many systems apply a combination of several of these basic multiple access schemes, such as TDMA and FDMA as can be typically found in cellular networks.

A channel, in this context, refers to a system resource allocated to users or terminals, typically mobile users and wireless terminals, enabling establishing communication with the network or other users. Based on the channel attributes, terminal specifications, geographic distribution of users, nature of traffic, regulation, quality of service, and other factors, a specific multiple access scheme is defined.

In wireless networks and channels, the most important resource to consider for multiple access is the bandwidth allocated to that channel. As typically a limited amount of bandwidth is allocated to a wireless channel, a wireless system is required to accommodate as many users as possible by effectively sharing the limited bandwidth. Therefore, for wireless communications, the term multiple access could be defined as a means of allowing multiple users to simultaneously share the finite bandwidth with least possible degradation in the performance of the system.

The Time Division Multiple Access (TDMA) scheme provides time-slots to different data-streams (or transmitters), typically in a cyclically repetitive frame structure. For example, node 1 may use time slot 1, node 2 time slot 2, etc. until the last transmitter. Then it starts all over again, in a repetitive pattern. An advanced form is Dynamic TDMA (DTDMA), where the allocation of time slots to transmitters may change in real time. Packet Mode Multiple Access is a variation of TDMA, which is typically based on a random or pseudo-random access in time, preferably accounting for transmission collisions.

The Frequency Division Multiple Access (FDMA) scheme provides frequency bands to different data-streams, possibly on a dynamic basis. FDMA may allocate specific frequency bands to specific transmitters, for an entire session, or dynamically change that allocation, as done in Frequency Hopping (FH). An advanced form of FDMA is the Orthogonal Frequency Division Multiple Access (OFDMA) scheme, where each transmitter may use several sub-carriers, making it possible to provide different quality of service (different data rates) to different users. The assignment of sub-carriers to users may be changed dynamically, based on current radio channel conditions and traffic.

The Code Division Multiple Access (CDMA) scheme, also known as Spread Spectrum Multiple Access (SSMA), is based on spread spectrum, meaning that a wider radio spectrum is used than the data rate of each of the transferred bit streams, and several message signals are transferred simultaneously over the same carrier frequency, utilizing different spreading codes. The wide bandwidth makes it possible to send with very poor signal-to-noise ratio conditions.

One form is direct sequence spread spectrum (DS-CDMA), where each symbol (e.g. bit) is represented by a long code sequence of pulses, called chips. The sequence is the spreading code, and each message or transmitter uses a different spreading code, as done for example by different satellites broadcasting in a navigation system such as the GPS. Another form is frequency-hopping (FH-CDMA), where the channel frequency is changing rapidly according to a sequence that constitutes the spreading code.

The Space Division Multiple Access (SDMA) scheme is based on directional antennas or phased array techniques, enabling to focus the transmitting signal power in a narrow direction, or likewise limit the receiving noise to small angles. Examples of SDMA are sector antennas at cellular base stations, typically covering 120 degrees in azimuth.

Multiple access methods typically require careful synchronization among end users, either in time or frequency or code or orientation of antennas, particularly when the related channel resources (such as time-slots, frequency-bands, spreading-codes) are dynamically allocated. So basically, a specific channel access parameter such as time slot or center frequency, assigned to a specific user or transmission, reflects the need not to be in conflict with other users or transmissions, so obviously should be administered precisely.

It should also be noted that a multiple access method is typically (and not surprisingly) a method for efficiently accessing a communications channel or network, and not a method to communicate payload or application data. A system may sometimes use the multiple access method to communicate system data, such as the terminal ID, particularly when a specific multiple access parameter directly identifies a specific terminal (e.g.—terminal #1 is assigned with time-slot #1 or frequency-band #1), but typically not further. Payload data, application data or user defined data, is traditionally communicated by modulation of a carrier, typically an RF carrier in radio communications, after the channel is acquired.

Many modulation methods are known and practiced in the art, for analog information, such as: Amplitude Modulation (AM), Frequency Modulation (FM), Phase Modulation (PM); and for digital information, such as: Amplitude Shift Keying (ASK), Frequency Shift Keying (FSK), Phase Shift Keying (PSK), and Minimal Shift Keying (MSK); and spread spectrum methods such as: Frequency Hopping Spread Spectrum (FHSS), Direct Sequence Spread Spectrum (DSSS), Orthogonal Frequency Division Multiplexing (OFDM).

Yet sometimes, even considering such efficient modulation schemes, there is a need to communicate more data, and increase the system throughput.

An example of such a need is related to the satellite Search and Rescue (SAR) system known as Cospas-Sarsat. Though the present invention is not limited to this specific system, Cospas-Sarsat (C/S) is a good example to clarify the present art, as well as the present invention, so it is specifically referred hereto. A detailed description of the system can be found in—www.cospas-sarsat.org.

Cospas-Sarsat is a satellite communication system to assist SAR of people in distress, all over the world and at anytime. The system was launched in 1982 by the USA, Canada, France and the Soviet Union (now Russia) and since then, it has been used for thousands of SAR events and has been instrumental in the rescue of over 30,000 lives worldwide. The goal of the system is to detect and locate signals transmitted from distress radio beacons and forward that data to ground stations, in order to support organizations responsibility for SAR operations. The system uses spacecraft—Low Earth Orbit (LEO) and Geostationary (GEO) satellites and in the future also Medium Earth Orbit (MEO) satellites, to detect and relay to ground stations signals transmitted from radio beacons in the 406 MHz band. When active, a C/S beacon repeatedly transmits a signal per 50 seconds, each for about 0.5 second. The position of the beacon is determined either by the Doppler shift of the received beacon signal or by position coordinates encoded in the signal, provided by a built-in Global Navigation Satellite System (GNSS) receiver. When the MEOSAR (segment of C/S SAR system related to the MEO satellites) will be fully operable, it could enable locating the beacon by trilateration, as the beacon signal will be (almost) simultaneously detected by at least three MEO satellites.

It should be noted that GNSS is usually a general term, as well as GPS (Global Positioning System) and SPS (Satellite Positioning System) and SNS (Satellite Navigation System); these acronyms may generalize particular systems such as the USA GPS or the Russian GLONASS or the European GALILEO. In the scope of the present invention, unless referring to a specific system, the terms GNSS and GPS usually refer to any satellite navigation system.

Several types of Cospas-Sarsat beacons are defined, mainly differing by mechanical structure or activation method, according to their main use: a) Emergency Position Indicating Radio Beacon (EPIRB) for marine use; b) Emergency Locator Transmitter (ELT) for aviation use; and c) Personal Locator Beacon (PLB) for personal and/or terrestrial use. For the purpose of the present invention, the terms EPIRB, PLB and sometimes also ELT are alternatively used, and unless indicated otherwise, relate to any type of position indicating radio beacon, and vice versa.

Present Cospas-Sarsat beacons optionally comprise a built-in GNSS receiver, configured to determine self position, in terms of geographical coordinates. These coordinates are encoded in the message communicated to SAR centers. Present Cospas-Sarsat standards define several message formats, in which said position can be encoded. Obviously, the number of bits allocated to this encoded position defines the resolution of this position reported to SAR centers. Presently, this resolution is limited, in the best case, to four seconds of geographical latitude or longitude, i.e. 4/3600 of an angle. Resolution of 4 seconds is equivalent, in worst case, to 4/60 of a nautical mile, i.e. approximately 125 meters.

For several scenarios, e.g. searching for a person at sea on a stormy dark night, an error of 125 m in determining the position might be critical. Yet, if six more bits could be communicated to augment the coarse latitude plus coarse longitude encoded according to the standard, the location uncertainty could shrink to 125/8, i.e. approximately 16 meters. At this distance, a person may be significantly better heard and seen even on a stormy night.

The present inventor already referred to such a scenario and to the more general problem, in U.S. Pat. No. 7,693,216—Modulating transmission timing for data communications. Katz disclosed a method for communicating data from a transmitter to a receiver, in a periodical burst transmission regime, by modulating the transmission period.

Though that method could be useful in many cases, it might present a problem in other cases, where it is important to distinguish between a change in channel access parameter (e.g. transmission time) due to the standard access scheme or due to additional information communicated thereby.

It is then an object of the present invention to use present communication schemes, typically designed for other purposes, in order to communicate data, either system data or application data, from a transmitter to a receiver, without significantly downgrade that scheme related to its original purpose.

It is also an object of the present invention to use a channel access scheme in order to communicate data from a transmitter to a receiver, without violating the related channel access standards.

It is still an object of the present invention to communicate data during channel accessing, without significantly disturbing the channel access process itself.

It is another object of the present invention to convey plain information from a transmitter to a receiver, during channel access, using at least one of the following multiple access schemes: Time Division Multiple Access (TDMA), Frequency Division Multiple Access (FDMA), Code Division Multiple Access (CDMA), and Space Division Multiple Access (SDMA).

It is additionally an object of the present invention to communicate data during the channel access phase, by modulating at least one of the following channel access parameters: transmission time, transmission frequency, spreading code, radiation directivity, radiation polarization.

It is yet an object of the present invention to enable a radio beacon configured to periodically transmit short signals, to communicate additional data, without modifying the present signal format.

It is further an object of the present invention to enable a radio beacon configured to periodically transmit location reports, to communicate additional data upgrading the location report resolution, without modifying the present signal format.

It is yet another object of the present invention to enable a receiver decoding data communicated during channel access.

It is yet also an object of the present invention to provide a method to communicate data during channel access, such that can be easily implemented without a significant, if any, hardware change.

It is still another object of the present invention to employ GNSS timing and position information, in the process of conveying data through modulation of channel access parameters.

Other objects and advantages of the invention will become apparent as the description proceeds.

SUMMARY OF THE INVENTION

The basic background or scenario for the present invention is of a transmitter and a receiver communicating over a defined communication channel.

The typical scenario, however, is of a wireless network, comprising at least one receiver and multiple transmitters, configured to access this receiver over a wireless channel. Then, a multiple access scheme is employed to effectively share the limited bandwidth of this channel among the multiple transmitters, simultaneously.

It should be noted that though most descriptions and examples disclosed in the context of the present invention are related to wireless communications, and particularly to wireless digital communications, the present invention is not restricted so, and may be applied to wireless and wire line and hybrid networks, PANs (Personal Area Networks) and LANs (Local Area Networks) and WANs (Wide Area Networks), either analog or digital, such as the Public Switched Telephone Network (PSTN) and the Internet, cellular and mobile networks, Ethernet and Token Ring nets, Wi-Fi and Wi-Max, Bluetooth, CCTV and video networks, satellite communication links and actually any kind of communication, either on RF (Radio Frequency) or any other part of the Electromagnetic spectrum, such as optical bands, visible or UV or IR.

Basically, the disclosed method relates to a channel access scheme, or multiple access scheme, at least one of: Time Division Multiple Access (TDMA), Frequency Division Multiple Access (FDMA), Code Division Multiple Access (CDMA), Space Division Multiple Access (SDMA), but it is not limited to those schemes, or any other specific channel access scheme, and may be implemented, for example, with a combination of several channel access schemes.

Furthermore, as a skilled person may appreciate, variations of the basic four multiple access methods (TDMA, FDMA, CDMA, SDMA) are known in the art, some applied to specific scenarios (such as satellite communications) or methods (such as packet switching), e.g. Aloha or Slotted Aloha, others adopted to noisy channels such as Carrier Sense Multiple Access (CSMA) or Multiple Access with Collision Avoidance (MACA). All those and other methods and variations of channel access may be related to the present invention.

The invention is directed to a method for communication of plain information during channel access, comprising the steps of:

a. defining a channel access scheme and at least one parameter in said scheme;
b. defining for said parameter a coarse resolution part and a fine resolution part;
c. configuring the magnitude of said coarse resolution part according to said access scheme;
d. configuring the magnitude of said fine resolution part associated with said plain information;
e. accessing the channel configuring the magnitude of said parameter to the sum of magnitudes of said coarse resolution part and said fine resolution part.

And the additional steps of:

f. detecting the signal associated with said channel access;
g. decoding said fine resolution part and accordingly determining said plain information.

The parameter in the channel access scheme that is typically used to convey plain information according to the present invention is at least one of: transmission time, start of transmission time, time between transmissions, transmission frequency, transmission center frequency, transmission frequency band, spreading code, radiation directivity, and radiation polarization.

According to a first embodiment of the present invention, a TDMA channel scheme is used, wherein multiple devices are configured to periodically transmit short bursts of data to be detected by at least a single receiver, then the time of burst transmission start, or equivalently the time between successive transmissions of a particular device, is the parameter employed to convey plain information during the channel access, by slightly modifying it according to that plain data. This slight modification is on top of the more significant configuration of that parameter, as employed according to the basic TDMA scheme to avoid collisions among the transmitters. To illustrate that, it can be assumed that each device periodically transmits a short signal, wherein the basic time period between successive transmissions, as dictated by the TDMA scheme, is in multiples of 0.5 sec, and on top of it, changes of ±1 msec can be employed, up to ±16 msec, to convey plain information. Thus, 32 levels (neglecting the 0 msec level meaning no change) of modulation are defined, i.e. 5 bits of data.

It is assumed that the compatible receiver can tolerate the fine resolution change in transmission time, up to ±16 msec according to this example, and so is the channel scheme. Typically, multiple access schemes already account for inaccuracies and jitters in channel access parameters. In TDMA, guard time slots are typically spaced in between the TDMA slots allocated to convey data, and in FDMA, guard bands are introduced between frequency bands to minimize adjacent channel interference. So, according to the present invention, the fine resolution part of the modulated parameter is typically smaller than the guard time slot in case of TDMA, and guard band in case of FDMA. The same concept can be applied also to CDMA and SDMA, accordingly considering the spreading code resolution and direction (spatial angle) resolution.

Alternatively or in addition, multiple access schemes may assume a certain rate of collision or interference, and accordingly employ measures to account for such interference, such as redundant transmissions (in time or frequency), forward error correction (FEC), and so on.

According to a second embodiment of the present invention, an FDMA channel scheme is used, then the frequency band or center transmission frequency is the parameter employed to convey plain information during the channel access, by slightly modifying it according to that plain data. This slight modification is on top of the more significant configuration of that parameter, as employed according to the basic FDMA scheme to avoid collisions (in FDMA this is usually referred to as interference or crosstalk). To illustrate that, a system with multiple devices accessing one channel can be considered, each device allocated with a frequency band, defined by a center frequency in multiples of 1 MHz, and on top of it, changes of ±1 KHz can be employed, up to ±16 KHz, to convey plain information. Thus, 32 levels (neglecting the 0 KHz level meaning no change) of modulation are defined, i.e. 5 bits of data. Accordingly, a compatible receiver is configured to detect all the bandwidth used by these transmitting devices, accounting also for guard bands configured to avoid interference or crosstalk. These guard bands may be also considered to tolerate the fine resolution modulation of frequency, according to the present invention, in the FDMA case.

A person skilled in the art may note that though this second embodiment of the present invention may look like the well known FM modulation method, or the digital variation of FM known as FSK (Frequency Shift Keying), it is not so. Prior art FM or FSK modulation is typically applied after a channel is acquired, and not during channel access. The channel access phase is not considered by present art robust enough to convey plain information, i.e. information that is not known at the receiver in advance. In addition, when receiving a signal transmitted during the channel access phase, usually no modulated data is decoded there, since typically a frame synchronization and/or bit synchronization is not been accomplished yet. Traditionally, during channel access, the carrier is not modulated with plain information but rather not modulated at all (CW), or modulated with a synchronization pattern (such as 1010.) or by pre-define correlation series (such as Gold codes). Also, the access phase is typically short, so is probably not the natural place for conveying much information.

In addition, a skilled person may appreciate that the modulation method disclosed by the present invention, for the fine resolution part of the channel access parameter, obtains a variable modulation index or depth, differently than what is typically employed by present art modulation methods such as ASK, FSK, etc. For example, 2-level FSK is a modulation method that defines two possible shifts of the center transmission frequency, each shifted frequency representing a possible bit value (1 or 0); 4-level FSK is a modulation method that defines four possible shifts of the center transmission frequency, each shifted frequency representing a possible pair of bits (00, 01, 10, or 11); while the present invention allows any number of frequency shifts (or time shifts, etc.), not necessarily pre-defined in number, practically as long as the maximum fine resolution part of the channel access parameter is smaller than the coarse resolution of this parameter. In digital representation this limit is straightforward, as the coarse resolution part of the parameter is represented by the most significant bits (MSBs) and the fine resolution part is associated with the least significant bits (LSBs).

Though not restricted so by the present invention, it is expected that the plain information transmitted during the channel access according to the present invention, will stay constant during that phase. This is typically not the case with present art modulation methods such as FM and FSK, upon channel acquisition.

According to a third embodiment of the present invention, a CDMA channel scheme is used, and the parameter employed to convey plain information during the channel access is still the transmission time or transmission center frequency, and this parameter is modulated as described in the context of the first and second embodiments of the present invention.

The present method discloses also acquiring at least one of: position or time, from a Global Navigation Satellite System (GNSS), and associating said parameter therewith.

The accurate GNSS timing enables managing the time and frequency (typically synthesized from a local oscillator, which can be Phased Locked to the accurate GNSS clock) more precisely, so that extra precision could be harnessed to communicate plain information according to the present invention, and still not significantly increase the rate of transmission collision or interference.

Furthermore, the communicated plain information itself can be associated at least with one of: the geographical location from where said information is transmitted, or the time of transmission.

This can be particularly useful to report the transmitter's position or time of transmission, information that can be employed to locate that transmitter and even assist in determining the receiver's location, considering the time of arrival (TOA) of signals from several transmitters (reporting their position as well as time of transmission) at the receiver, i.e. applying a trilateration algorithm.

According to the present method, the coarse resolution part of the channel access parameter can be configured randomly or pseudo-randomly.

Such scheme, applied to TDMA (particularly in burst transmission) or FDMA (particularly in Frequency Hopping), may typically reduce the chance for transmission collision and interference.

The invention is further directed to a device for transmission of plain information during channel access, comprising at least a transmitter coupled to controller, said transmitter configured to access the channel according to an access scheme, said controller configured to control at least one parameter of said scheme, said parameter defined with a coarse resolution part plus a fine resolution part, wherein said controller configured to configure the magnitude of said coarse resolution part according to said scheme, and the magnitude of said fine resolution part in association with said plain information, and said transmitter configured to access the channel with the magnitude of said parameter configured to the sum of magnitudes of said coarse resolution part and said fine resolution part.

The device according to the present invention may employ a multiple access scheme, at least one of: Time Division Multiple Access, Frequency Division Multiple Access, Code Division Multiple Access.

The channel access parameter used by said device in order to convey plain data, can be associated at least with one of: transmission time, start of transmission time, time between transmissions, transmission frequency, transmission center frequency, transmission frequency band, spreading code.

Further, the device according to the present invention may comprise an antenna or antenna array, coupled to the transmitter and optionally also coupled to the controller, employing a channel access method of Space Division Multiple Access, wherein the parameter modulated to communicate plain information is associated with at least one of: radiation directivity or polarization.

The device according to the present invention may comprise a GNSS receiver coupled to the controller, wherein the parameter modulated to communicate plain information is associated with at least one of: time or position information acquired by said GNSS receiver.

One way to associate that parameter with GNSS time is to synchronize the transmitter's clock with the GNSS accurate clock, enabling generating accordingly accurate timing and frequency in the device. Another way to associate that parameter with GNSS position is to report self position acquired from the GNSS, as plain information which is communicated through this parameter.

Furthermore, the device can be embodied according to the present invention as a Position Indicating Radio Beacon.

In this device, the plain information can also be associated with at least one of: the geographical position of the device or the time of transmission. Communicating both the time of transmission and geographical position, enables using this device as a reference for a location system, employing at a compatible receiver whose location should be determined, TOA or trilateration techniques, similarly to those employed in the GPS.

According to said first embodiment of the present invention, the device is configured to periodically transmit a signal, wherein the parameter modulated to communicate plain information is the time period between consecutive transmissions, or the time of transmission. Synchronizing the transmission time with the GNSS time (e.g. the atomic clock based GPS time), can provide an accurate basis for time measurement common to transmitting and receiving devices, which may obviously be useful according to the present invention.

Optionally according to said first embodiment of the present invention, in the device, the coarse resolution part of the parameter modulated to communicate plain information is configured pseudo-randomly. This may avoid repetitive transmission collisions in a communication network or system.

The invention is also directed to a receiver for detection of plain information communicated during channel access, comprising at least a detector coupled to a controller, said detector configured to detect at least one pre-defined parameter of a channel access scheme in a received signal, and couple said detected parameter to said controller, said controller configured to determine the magnitude of the pre-defined fine resolution part of said detected parameter, and accordingly determine said plain information.

The receiver, according to the present invention, may be configured to a channel access scheme, at least one of: Time Division Multiple Access, Frequency Division Multiple Access, Code Division Multiple Access.

Said pre-defined parameter of a multiple access scheme, in the receiver, can be associated at least with one of: transmission time, start of transmission time, time between transmissions, transmission frequency, transmission center frequency, transmission frequency band, spreading code, radiation directivity, polarization.

According to said first embodiment of the present invention, the device is configured to periodically transmit a signal, wherein the parameter modulated to communicate plain information is the time period between consecutive transmissions, so the receiver according to the first embodiment of the present invention, comprises a detector to measure said time period, couple data associated with said time measurement to said controller, wherein said controller is configured to calculate the fine resolution part of said detected time period, and accordingly determine said plain information.

To illustrate that, if the basic time period between successive transmissions is an integer number of 0.5 seconds, and if the time period modulation according to the present method is an integer number of 1 msec (plus or minus), and up to ±16 msec, then if the detected time period is n*0.5 sec±m*1 msec, wherein n and m are integer numbers and m≤16, then "±m" is decoded as the encoded plain information, assuming a noise level (jitter) lower than ½ msec.

Alternatively, the receiver according to the present invention comprises a GNSS receiver coupled to the controller, and configured to determine at least one of: self location; the geographical location from where said signal was transmitted; the distance or direction to where said signal was transmitted from; the time when said signal was transmitted or received.

Other objects and advantages of the invention will become apparent as the description proceeds.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein:

FIG. 1a depicts the nominal transmission start time, for two transmissions: T1.000 and T2.000 respectably, wherein T1 and T2 are in integer seconds (e.g. 3 sec and 23 sec); T1.000 equals T1 seconds and 0 (zero) msec; and T2.000 equals T2 seconds and 0 (zero) msec.

FIG. 1b presents the encoding table, associating plain information represented in 3 bits with transmission start time modulation in milliseconds. The table shows that information of 000 is associated with −1 msec of timing change, 001 is associated with −2 msec, and so on.

FIG. 1c depicts the transmission start time modulated by plain information, for two transmissions: at T1.001 and (T2−1). 998 seconds respectably, wherein T1 and T2 are in integer seconds; T1.001 equals T1 seconds and 1 msec; and (T2−1). 998 equals (T2−1) seconds and 998 msec. The left depicted transmission, starting at T1.001 sec, was shifted in time 1 msec ahead related to the unmodulated time of T1.000 sec, to represent plain information of 100 (in bits); the right depicted transmission starting at (T2−1). 998 sec was shifted 2 msec back, related to the nominal time of T2.000 sec (depicted in 1a), to represent plain information of 001 (in bits).

FIG. 2a depicts the nominal repetition period between two transmissions: T.000, wherein T is in integer seconds; T.000 equals T seconds and 0 (zero) msec.

FIG. 2b presents the encoding table, associating plain information represented in 3 bits with the time repetition period modulation in milliseconds. The table shows that information of 000 is associated with −1 msec of timing change, 001 is associated with −2 msec, and so on.

FIG. 2c depicts the transmission repetition period modulated by plain information of 100, to T1.001, wherein T is in integer seconds; T1.001 equals T1 seconds and 1 msec. The nominal repetition period shown in FIG. 2a was incremented by 1 msec, representing plain information of 100 (in bits).

FIG. 3a depicts the nominal center frequency, for two transmissions: F1.000 and F2.000 respectably, wherein F1 and F2 are in integer MHz (e.g. 3 MHz and 23 MHz); F1.000 equals F1 MHz and 0 (zero) KHz; and F2.000 equals F2 MHz and 0 (zero) KHz.

FIG. 3b presents the encoding table, associating plain information represented in 3 bits with center frequency modulation in KHz. The table shows that information of 000 is associated with −1 KHz of frequency change, 001 is associated with −2 KHz, and so on.

FIG. 3c depicts the center frequency modulated by plain information, for two transmissions: at F1.001 and (F2−1). 998 MHz respectably, wherein F1 and F2 are in integer multiples of 1 MHz; F1.001 equals F1 MHz and 1 KHz; and (F2−1). 998 equals (F2−1) MHz and 998 KHz. The left depicted transmission, at F1.001 MHz, was shifted +1 KHz in frequency related to the unmodulated center frequency of F1.000 MHz, representing plain information of 100 (in bits); the right depicted transmission at (F2−1). 998 MHz was shifted −2 KHz in frequency, related to the nominal center frequency of F2.000 MHz, (depicted in 3a), to represent plain information of 001 (in bits).

FIG. 4 shows a block diagram of the transmitting device according to the present invention. Three blocks are depicted: a transmitter, coupled to a microcontroller (with integrated RAM and EPROM), said controller coupled to a GNSS receiver. Both the transmitter and GNSS receiver are depicted with antennas coupled thereto. The picture depicts that the channel access control is routed from the controller to the transmitter, and that the GNSS receiver provides time and position data to the controller.

FIG. 5 shows a block diagram of the receiver according to the present invention. Three blocks are depicted: a detector, coupled to a microcontroller (with integrated RAM and EPROM), said controller coupled to a GNSS receiver. Both the detector and GNSS receiver are depicted with antennas coupled thereto. The picture depicts that the channel access parameter is provided to the controller by the detector, and that the GNSS receiver provides time and position data to the controller.

DETAILED DESCRIPTION

The invention is directed to a method for communication of plain information during channel access, comprising the steps of:
a. defining a channel access scheme and at least one parameter in said scheme;
b. defining for said parameter a coarse resolution part and a fine resolution part;
c. configuring the magnitude of said coarse resolution part according to said access scheme;
d. configuring the magnitude of said fine resolution part associated with said plain information;
e. accessing the channel configuring the magnitude of said parameter to the sum of magnitudes of said coarse resolution part and said fine resolution part.
And the additional steps, related to the receiving process, of:
f. detecting the signal associated with said channel access;
g. decoding said fine resolution part and accordingly determining said plain information.

The basic access schemes associated with the presently disclosed method are, at least one of: Time Division Multiple Access (TDMA), Frequency Division Multiple Access (FDMA), Code Division Multiple Access (CDMA), Space Division Multiple Access (SDMA), though this is not to limit implementing the invention with any other access scheme.

The parameter in the channel access scheme that is typically used to convey plain information according to the present invention is at least one of: transmission time, start of transmission time, time between transmissions, transmission frequency, transmission center frequency, transmission frequency band, spreading code, radiation directivity, and radiation polarization.

According to a first embodiment of the present invention, a TDMA channel scheme is used, wherein multiple devices are configured to periodically transmit short bursts of data to be detected by at least a single receiver, then the time of burst transmission start, or equivalently the time between successive transmissions of a particular device (repetition period), is the parameter employed to convey plain information during the channel access, by slightly modifying it according to that plain data. This slight modification is on top of the more significant modification of that parameter, as employed according to the basic TDMA scheme to avoid collisions among the transmitters.

Figure 1:
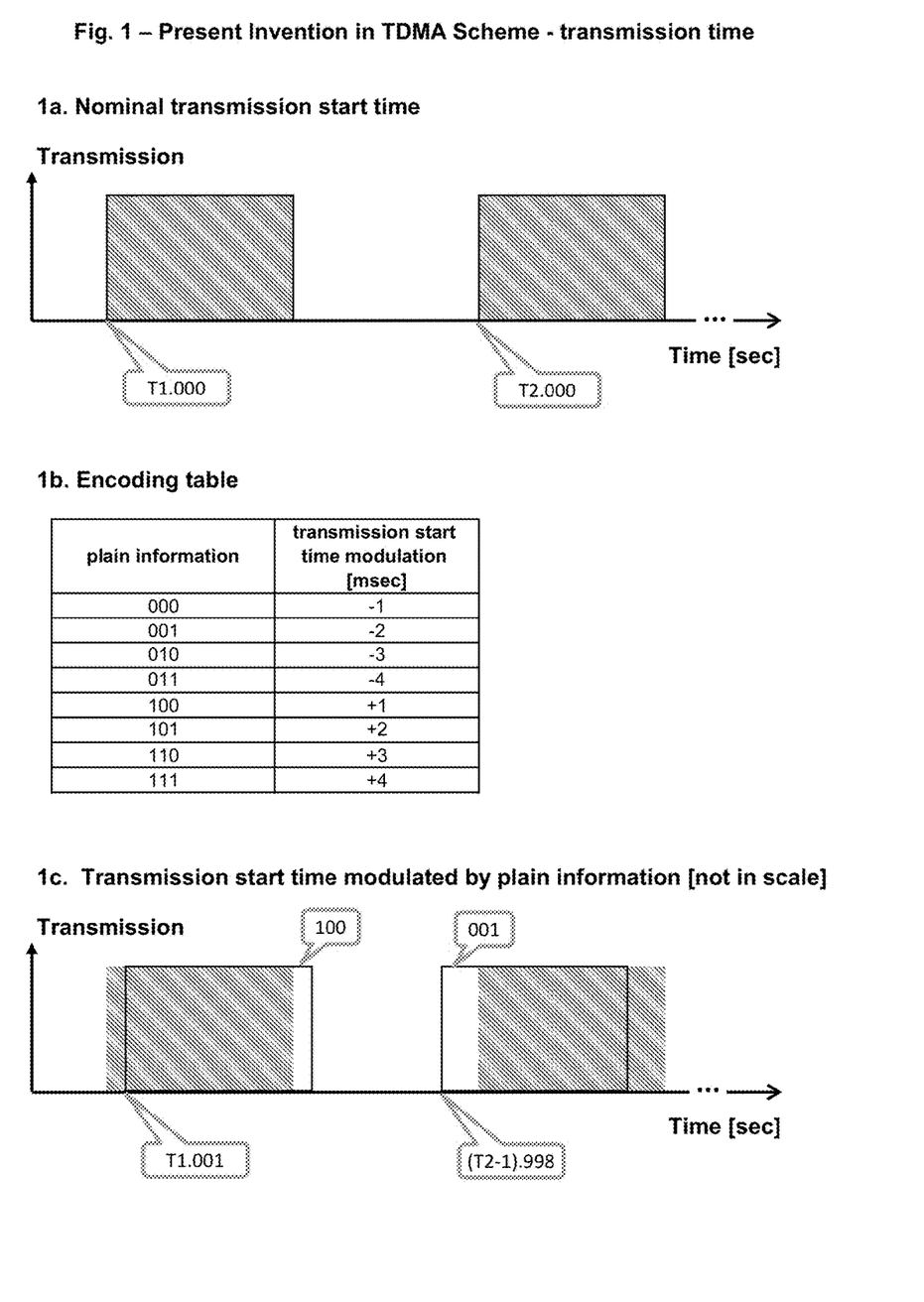
FIG. 1 illustrates the method according to the present invention in a TDMA scheme, modulating the time transmission start, in three parts.

FIG. 1 illustrates the method according to the present invention in a TDMA scheme, modulating the time of transmission starting, in three parts:

FIG. 1a depicts the nominal transmission start time, for two transmissions: T1.000 and T2.000 respectably, wherein T1 and T2 are in integer multiples of seconds; T1.000 equals T1 seconds and 0 (zero) msec; and T2.000 equals T2 seconds and 0 (zero) msec.

FIG. 1b presents the encoding table, associating plain information represented in 3 bits with transmission start time modulation in milliseconds. The table shows that information of 000 is associated with −1 msec of timing change, 001 is associated with −2 msec, and so on.

As a skilled person may appreciate, associating the coarse resolution part of the transmission time with round seconds, and the fine resolution part of the frequency with round milliseconds, is only a matter of a specific embodiment. Alternatively, for example, the coarse resolution part of the time parameter could be an integer multiple of 1.5 sec, and the fine resolution part could be defined in integer multiples of 100 msec (milliseconds) or 5 msec or 100 μs (microseconds) or 10 μs, as long as the coarse resolution defined for this parameter is higher than the fine resolution.

Furthermore, preferably, the coarse resolution defined for said parameter should be larger than the maximum fine resolution part, so for example, if the coarse resolution of the time of transmission is 1 sec, then the fine resolution part should be smaller than 1 sec, and since the fine resolution is defined as 1 msec, then this preferred limit enables a maximum of 999 possible modulation levels (if only one way changes are allowed), or +499 and −499 (if two way changes are allowed). In binary representation, 256 possible modulations represent 8 bits, 512 possibilities are encoded in 9 bits, etc.

FIG. 1c depicts the transmission start time modulated by plain information, for two transmissions: at T1.001 and (T2−1). 998 seconds respectably, wherein T1 and T2 are in integer seconds; T1.001 equals T1 seconds and 1 msec; and (T2−1). 998 equals (T2−1) seconds and 998 msec. The left depicted transmission, starting at T1.001 sec, was shifted in time 1 msec ahead, related to the nominal timing (depicted in 1a) to represent plain information of 100 (in bits); the right depicted transmission starting at (T2−1). 998 sec was shifted 2 msec back, related to the nominal timing (depicted in 1a), to represent plain information of 001 (in bits).

Preferably, according to the first embodiment of the present invention, the time between successive transmissions (repetition period) is chosen to modulate and represent the plain information.

Figure 2:
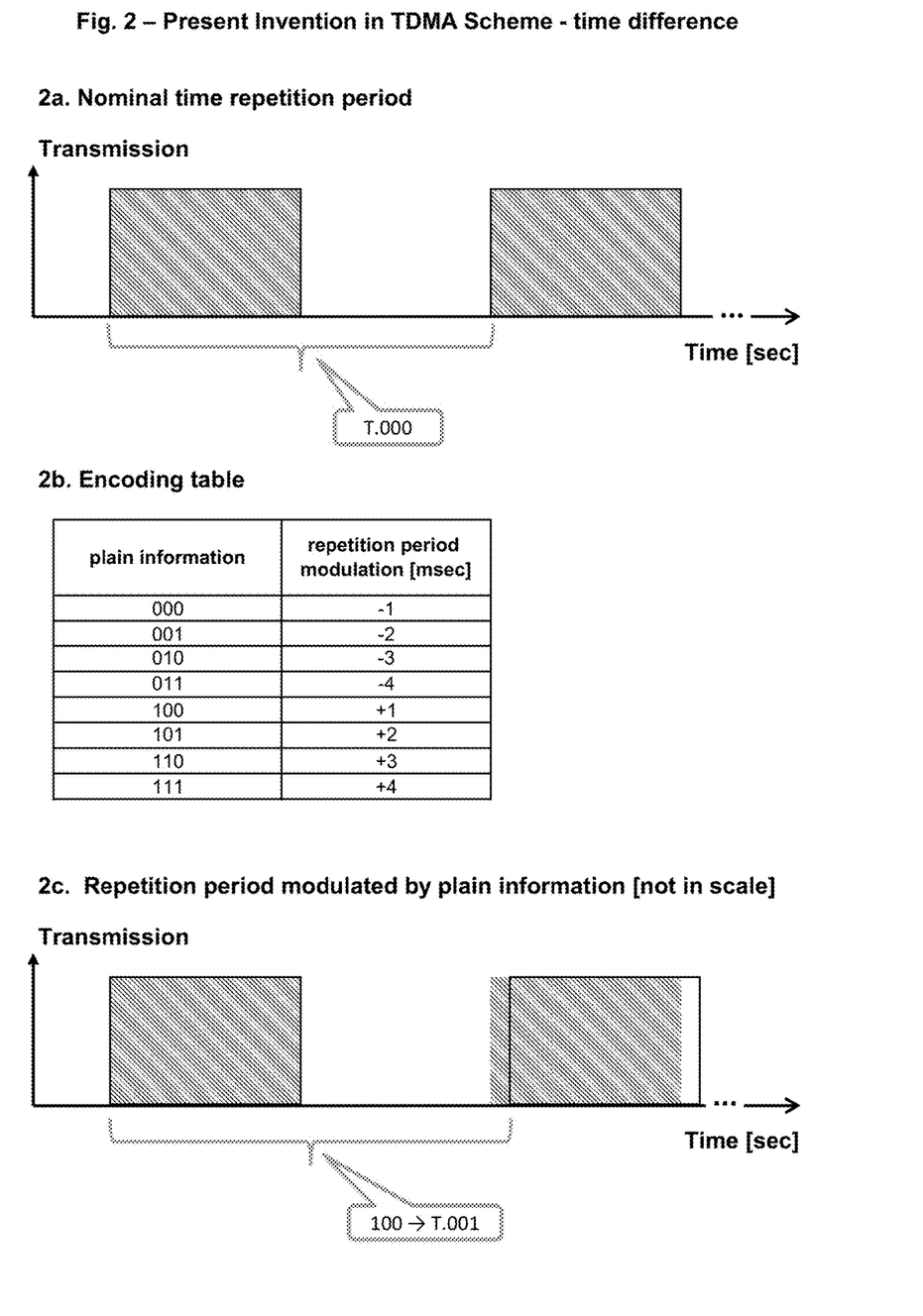
FIG. 2 illustrates the method according to the present invention in a TDMA scheme, modulating the time repetition period (time between successive transmissions), in three parts.

FIG. 2 illustrates the method according to the present invention in a TDMA scheme, modulating the repetition transmission period, in three parts:

FIG. 2a depicts the nominal time repetition between two successive transmissions: T.000, wherein T is in integer multiples of seconds; T.000 equals T seconds and 0 (zero) msec.

FIG. 2b presents the encoding table, associating plain information represented in 3 bits with repetition time modulation in milliseconds. The table shows that information of 000 is associated with −1 msec of timing change, 001 is associated with −2 msec, and so on.

FIG. 2c depicts the repetition period modulated by plain information: T1.001, wherein T is in integer seconds; T.001 equals T seconds and 1 msec, wherein the 1 msec increment over T represents plain information of 100 (in bits).

Preferably, the coarse resolution part of the time between successive transmissions is defined as n*0.5 sec, wherein n is an integer number in the range of: 96≤n≤104, i.e. a time period of 48 sec to 52 sec. On top of it, changes of ±1 msec, representing the fine resolution part of said time period, can be employed, up to ±4 msec, to convey plain information. Thus, 8 levels of modulation are defined, i.e. 3 bits of data, and the modulated time period may be in the range of: (48−0.004)=47.996 sec to (52+0.004) sec=52.004 sec.

Preferably, according to the first embodiment of the present invention, the coarse resolution part of the time period between successive transmissions is configured pseudo-randomly. So n is generated in a pseudo-random manner, for each transmission, and by each transmitter, in the range of 96 to 104.

Assuming for example that n was pseudo-randomly configured to n=98, related to the time between the first and second transmissions, then the coarse resolution part of that time period is 98*0.5 sec=49 sec, so T=49 sec in FIG. 2a.

Then, according to the encoding table presented in FIG. 2b, in order to encode plain information of 100 (in binary format), the fine resolution part of the time period should be 1 msec.

The total magnitude of the modulated time period between the two successive transmissions depicted in FIG. 2c is then 49 sec+1 msec=49.001 sec.

As a skilled person may appreciate, different transmitters may have different time references (typically internal oscillators). When based on transmission repetition period, i.e. time difference, as illustrated in FIG. 2, this variation is not so influential, however when based on transmission time, i.e. absolute time, as illustrate in FIG. 1, this variation may degrade the present method accuracy.

Then, it could be useful to synchronize clocks among multiple transmitting devices, which can be done, according to the present invention, by employing timing signals derived by a GNSS.

The accurate GNSS timing, shared by all devices that have access to these signals, enables such time synchronization among different transmitting devices, so the time of transmission determined by one transmitting device, is synchronized with the time of transmission determined by another transmitting device.

The present method discloses also acquiring at least one of: position or time, from a Global Navigation Satellite System (GNSS), and associating the modulated channel access parameter therewith.

Furthermore, the communicated plain information itself can be associated at least with one of: the geographical location from where said information is transmitted, or the time of transmission.

Then, according to a preferred embodiment of the present invention, this plain information is associated with the transmitter's position, as derived from GNSS signals, enabling a remote station to determine the location of this transmitter.

The part of the disclosed method related to the receiving phase, comprises the steps of: detecting the signal associated with said channel access, and decoding said fine resolution part and accordingly determining said plain information. According to said first embodiment of the invention, upon detecting two consecutive transmissions from the same transmitting device, the time Tp between these transmissions is measured. Assuming a noiseless channel, it should be: Tp=n*0.5 sec±m*1 msec. Then, if n is known at the receiving side, m could be easily calculated, and using the encoding table in FIG. 2b, the transmitted plain information could be decoded. If n is unknown, however, m could still be determined, assuming that 0<m<250; then: an integer n' is defined, with an initial value n'=1, then n' is incremented in steps of 1, iteratively, until it is found that |Tp−n'*0.5 sec|<0.25 sec. Then |Tp−n'*0.5 sec| is rounded to the nearest millisecond and it is determined that |Tp−n'*0.5 sec|*1000=m. The sign of (Tp−n'*0.5 sec) solves the ambiguity associated with ±m.

As a person skilled in the art may appreciate, communications are usually involved with noise, particularly wireless communications, so noise should be considered in the detection and decoding process, according to the present invention. In the digital case, as elaborated so far according to the first embodiment of the invention, the present invention provides certain noise immunity due to the digital quantization nature, and it could be easily seen that noise producing jitter up to half the fine resolution, i.e. 0.5*msec, can be tolerated without error.

According to a second embodiment of the present invention, an FDMA channel scheme is used, then the center transmission frequency is the parameter employed to convey plain information during the channel access, by slightly modifying it according to that plain data. This slight modification is the fine resolution part of said center frequency, wherein the coarse resolution part of this parameter is the center frequency determined according to the basic FDMA scheme. According to this second embodiment, multiple devices are configured to access at least one receiver, in frequency hopping, such that a limited bandwidth is allocated in common to all devices, wherein each transmitter is configured to select a different transmission frequency at a specific time, in a pre-defined pattern, known in advanced to the receiver as well as all the transmitters.

Figure 3:
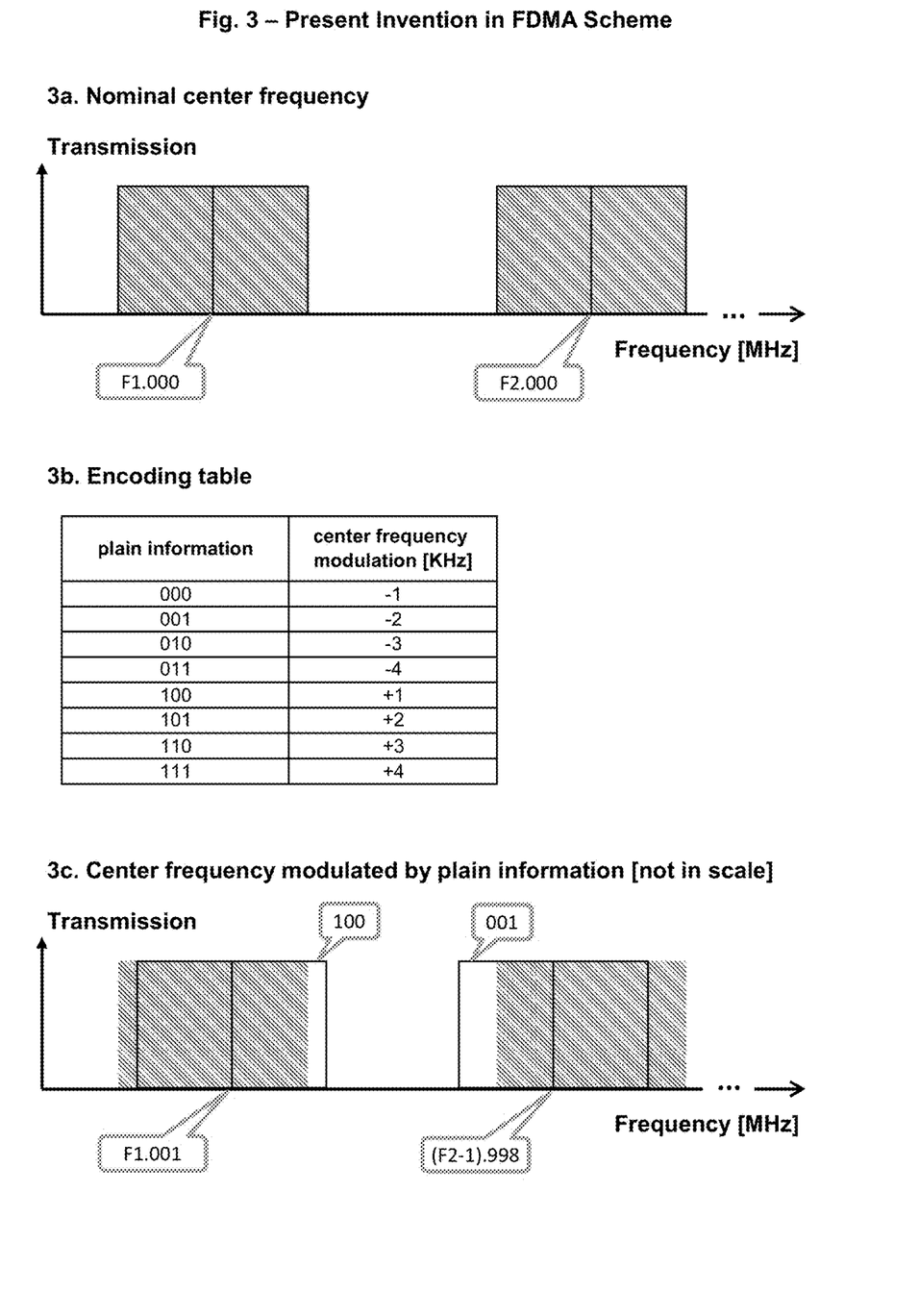
FIG. 3 illustrates the method according to the present invention in an FDMA scheme, in three parts.

FIG. 3 illustrates the method according to the present invention in an FDMA scheme, in three parts:

FIG. 3a depicts the nominal center frequency, for two transmissions: F1.000 and F2.000 respectably, wherein F1 and F2 are in integer multiples of MHz;

FIG. 3b presents the encoding table, associating plain information represented in 3 bits with center frequency modulation in KHz. The table shows that information of 000 is associated with −1 KHz of frequency change, 001 is associated with −2 KHz, and so on.

As a skilled person may appreciate, associating the coarse resolution part of the transmission frequency with integer multiples of MHz, and the fine resolution part of the frequency with integer multiples of KHz, is only a matter of a specific embodiment. Alternatively, for example, the coarse resolution part of the frequency could be still in round MHz, but the fine resolution part could be defined in multiples of 10 KHz or 5.5 KHz or 100 Hz or 10.2 Hz, for example, as long as the coarse resolution defined for this parameter is higher than the fine resolution part.

FIG. 3c depicts the center frequency modulated by plain information, for two transmissions: at F1.001 and (F2−1). 998 MHz respectably, wherein F1 and F2 are in integer MHz; F1.001 equals F1 MHz and 1 KHz; and (F2−1). 998 equals (F2−1) MHz and 998 KHz. The left depicted transmission, at F1.001 MHz, was shifted +1 KHz in frequency to represent plain information of 100 (in bits); the right depicted transmission at (F2−1). 998 MHz was shifted −2 KHz in frequency, related to the nominal center frequency (depicted in 3a), to represent plain information of 001 (in bits).

Then, according to the second embodiment of the present invention, the coarse resolution part of said transmission center frequency is preferably defined in the range of 401-449 MHz, in integer multiples of 1 MHz, i.e. 401 Mhz, 402 Mhz . . . 448 MHz, 449 MHz. The fine resolution part of the center frequency is m*(±1 KHz), where m is an integer number and 1≤m≤4. So, 8 levels of modulation are defined, i.e. 3 bits of data, and the modulated center frequency is in the range of: (401−0.004)=400.996 MHz to (449+0.004) MHz=449.004 MHz.

Back to FIG. 3a, using this preferred second embodiment configuration, assuming, for example, that the two depicted transmissions are at a center frequency of: F1=403 MHz and F2=435 MHz.

Then, according to the encoding table presented in FIG. 3b, in order to encode plain information of 100 (in binary format), the center frequency should be shifted in +1 KHz, and in order to encode plain information of 001 (in binary format), the center frequency should be shifted in −2 KHz.

The total magnitude of the modulated center frequency is then, as depicted in FIG. 3c: F1.001 MHz for the first transmission (left side in FIG. 3c, communicating 100), i.e. 403.001 MHz, and for the second transmission (right side in FIG. 3c, communicating 001) is (F2−1). 998 MHz, i.e. 434.998 Mhz.

In the receiving phase according to this second embodiment of the invention, the center frequency Fc of a transmitted signal is measured. Assuming a noiseless channel, it should be: Fc=n*MHz±m*KHz.

Then, if n is known at the receiving side, m could be easily calculated, and using the encoding table illustrated in FIG. 3b, the transmitted plain information could be decoded. If n is unknown, however, m could still be determined, assuming that 0<m<500, then: an integer n' is defined, with an initial value n'=1, then n' is incremented by 1, step by step, until it is found that |Fc−n'*MHz|<0.5 MHz. Then |Fc−n'*MHz| is rounded to the nearest KHz and it is determined that |Fc−n'*MHz|*1000=m. The sign of (Fc−n'*MHz) solves the ambiguity associated with ±m.

The issue of noise is obviously relevant also to frequency measurement, as a person skilled in the art may appreciate, so the noise should be considered also in the case of this second embodiment of the invention. Again, though the present invention may be well implemented in analog modulation, the digital modulation of the fine resolution part of a channel access parameter provides some advantages, one of them being the noise immunity associated with the digital quantization. So in the digital case, according to the second embodiment of the invention, it could be seen that noise producing frequency deviation up to 0.5*[fine resolution], or 0.5*KHz in this example, can be tolerated without error.

According to a third embodiment of the present invention, a CDMA channel scheme is used, and the parameter employed to convey plain information during the channel access is still the transmission time or transmission center frequency, and this parameter is modulated as described in the context of the first and second embodiments of the present invention.

According to a fourth embodiment of the present invention, a CDMA channel scheme is used, then the spreading code is the parameter employed to convey plain information during the channel access, by slightly modifying it according to that plain data. This slight modification is on top of the more significant modification of that parameter, as employed according to the basic CDMA scheme. According to this embodiment, multiple transmitters access one channel, each transmitter allocated with a unique spreading code, from a family of 64 bits (aka "chips") codes, such as Walsh codes used in CDMA schemes, and to that basic 64 bits code, 5 least significant bits are suffixed, to convey plain information. In the receiving process, the transmitted signal is detected, by correlating a down converted replica of the received RF signal, with said basic 64 bits spreading code, then the remaining 5 LSBs are decoded to determine the transmitted plain information.

The invention is further directed to a device for transmission of plain information during channel access, comprising at least a transmitter coupled to controller, said transmitter configured to access the channel according to an access scheme, said controller configured to control at least one parameter of said scheme, said parameter defined with a coarse resolution part plus a fine resolution part, wherein said controller configured to configure the magnitude of said coarse resolution part according to said scheme, and the magnitude of said fine resolution part in association with said plain information, and said transmitter configured to access the channel with the magnitude of said parameter configured to the sum of magnitudes of said coarse resolution part and said fine resolution part.

Figure 4:
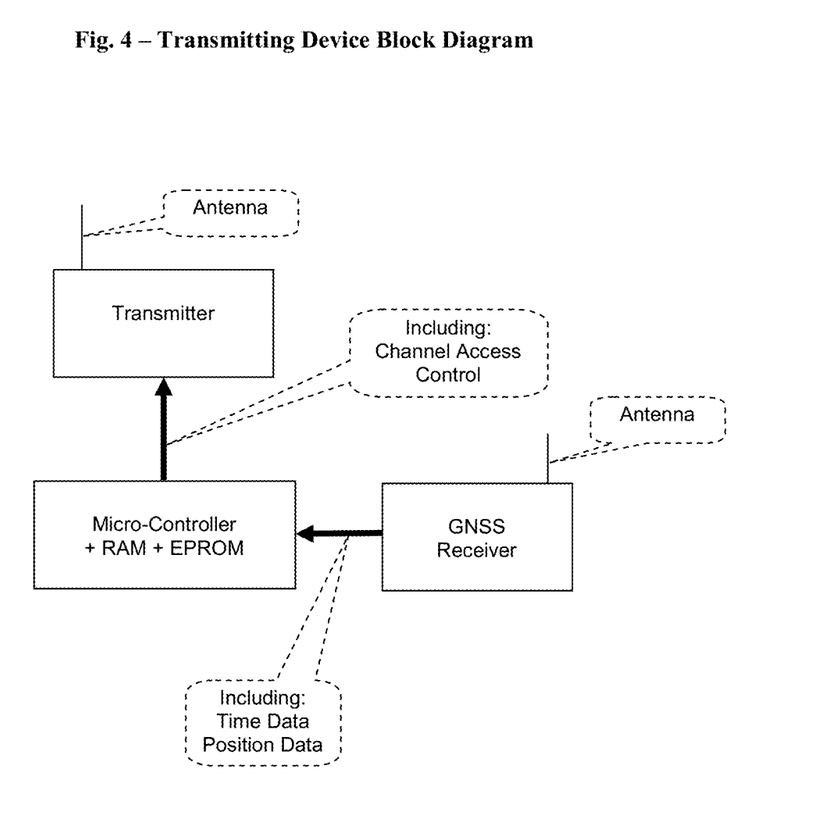

FIG. 4 shows a block diagram of the transmitting device according to the present invention.

Three blocks are depicted: a transmitter, coupled to a microcontroller (with integrated RAM and EPROM), and a GNSS receiver, said transmitter also coupled with an antenna. The picture depicts that the channel access control is routed from the controller to the transmitter.

The device according to the present invention may employ a multiple access scheme, at least one of: Time Division Multiple Access, Frequency Division Multiple Access, Code Division Multiple Access.

The channel access parameter used by said device in order to convey plain data, can be associated at least with one of: transmission time, start of transmission time, time between transmissions, transmission frequency, transmission center frequency, transmission frequency band, spreading code.

According to the first embodiment of the present invention, a TDMA channel scheme is used, so referring to FIG. 4, the channel access control routed from the controller to the transmitter may be associated with the timing of transmission.

According to the second embodiment of the present invention, an FDMA channel scheme is used, so referring to FIG. 4, the channel access control routed from the controller to the transmitter may be associated with the frequency of transmission.

According to a third embodiment of the present invention, a CDMA channel scheme is used, and the parameter employed to convey plain information during the channel access is still the transmission time or transmission center frequency, so referring to FIG. 4, the channel access control routed from the controller to the transmitter may be associated with either the transmission timing or the transmission frequency.

The device according to the present invention may comprise an antenna or antenna array, coupled to the transmitter and optionally also coupled to the controller, employing a channel access method of Space Division Multiple Access, wherein the parameter modulated to communicate plain information is associated with at least one of: radiation directivity or polarization.

Referring again to FIG. 4, an antenna is shown coupled to the transmitter, and the channel access control routed from the controller to the transmitter may optionally control also this antenna, or antenna array, and be associated with the radiation directivity or polarization.

As a person skilled in the art may appreciate, in satellite communications it is sometimes a good practice to simultaneously stream more than one signal between two antennas, by employing different (typically orthogonal) polarization patterns, enabling using the same frequency band to communicate two separate streams.

The device according to the present invention preferably comprises a GNSS receiver coupled to the controller, wherein the parameter modulated to communicate plain information is associated with at least one of: time or position information acquired by said GNSS receiver.

FIG. 4 also depicts a GNSS receiver, providing time and position data to the controller.

According to a preferred first embodiment of the present invention, the device is an Emergency Position Indicating Radio Beacon (EPIRB), or a Personal Locator Beacon (PLB), or an Emergency Locator Transmitter (ELT), configured to periodically transmit a signal, detectable by receivers onboard satellites (but also on aircraft, vessels, or terrestrial), using the channel access parameter of time between consecutive transmissions, modulating the fine resolution part of this parameter to communicate plain information, while the magnitude of the coarse resolution part of this parameter is possibly configured randomly or pseudo-randomly. Optionally, in this device, the plain information can be associated with at least one of: the geographical position of the device or the time of transmission.

One particular case of such preferred embodiment is a radio beacon compatible with the Cospas-Sarsat satellite system, traditionally operating on the 406 MHz band, either referring to the LEOSAR or/and GEOSAR or/and MEOSAR.

Since the Cospas-Sarsat beacon specifications allocate a limited number of bits to encode the GNSS position in the transmitted message, this can limit the position reported resolution and consequently the location accuracy. In this case, the present invention can communicate the rest least significant bits of the beacon coordinates, in order to augment the position report and increase its resolution and accuracy.

The invention is also directed to a receiver for detection of plain information communicated during channel access, comprising at least a detector coupled to a controller, said detector configured to detect at least one pre-defined parameter of a channel access scheme in a received signal, and couple said detected parameter to said controller, said controller configured to determine the magnitude of the pre-defined fine resolution part of said detected parameter, and accordingly determine said plain information.

Figure 5:
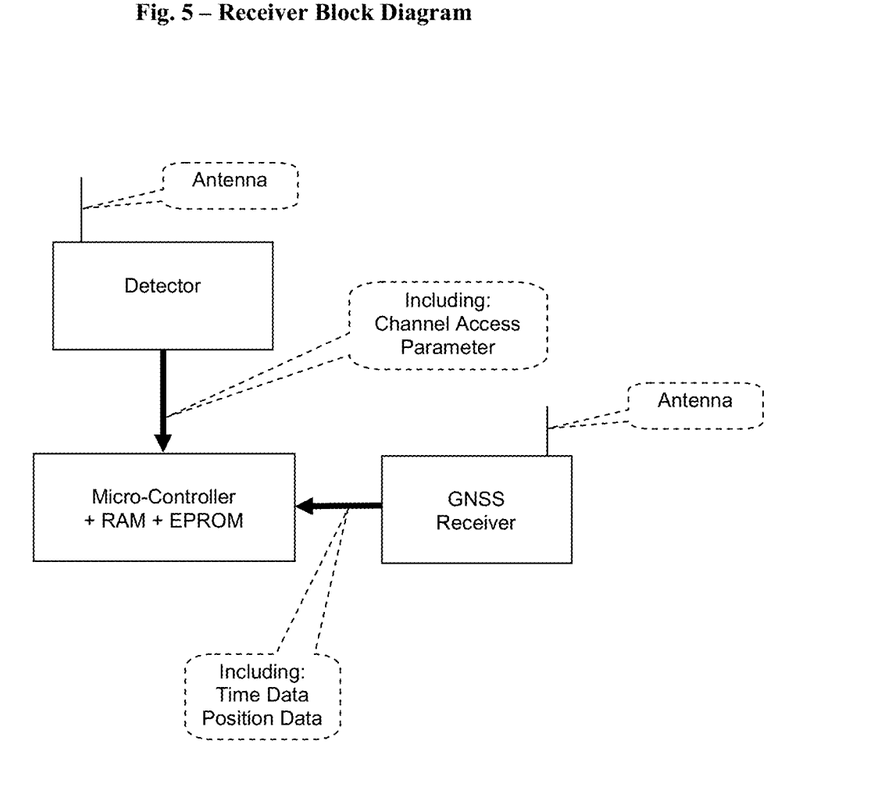

FIG. 5 shows a block diagram of the receiver according to the present invention.

Three blocks are depicted: a detector, coupled to a microcontroller (with integrated RAM and EPROM) and a GNSS receiver. The detector is shown with antenna coupled thereto. The picture also depicts that the channel access parameter is provided to the controller by the detector.

The receiver, according to the present invention, may be configured to a channel access scheme, at least one of: Time Division Multiple Access, Frequency Division Multiple Access, Code Division Multiple Access.

Said pre-defined parameter of a multiple access scheme, in the receiver, can be associated at least with one of: transmission time, start of transmission time, time between transmissions, transmission frequency, transmission center frequency, transmission frequency band, spreading code, radiation directivity, polarization.

According to the first embodiment of the present invention, a TDMA channel scheme is used, so referring to FIG. 5, the channel access parameter routed from the detector to the controller may be associated with the timing of transmission, as detected at the receiver.

As a skilled person may appreciate, the transmission time assessed at the receiver may be different than the transmission time determined at the transmitter, due to propagation delay and difference in reference clocks. The propagation delay can be neglected, if the channel access parameter used to convey data according to the present invention is a time difference, as the time period between consecutive transmissions. The difference in clocks can also be avoided if both transmitter and receiver synchronize their internal clocks to a same reference, as provided be a GNSS.

So, the receiver preferably comprises a GNSS receiver coupled to the controller, as shown in FIG. 5. FIG. 5 also shows the GNSS receiver providing time and position data to the controller.

Then, preferably, the receiver is configured to determine at least one of: self-location; the geographical location from where a signal was transmitted; the distance or direction to where said signal was transmitted from; the time when said signal was transmitted or received.

Preferably, according to the first embodiment of the present invention, the receiver is configured to detect signals transmitted by multiple transmitters employing a TDMA scheme, periodically transmitting short bursts of data, wherein the time between successive transmissions of a particular device, is the parameter employed to convey plain information during the channel access. Then, the coarse resolution part of this parameter is configured pseudo-randomly, and the fine resolution part of this parameter is modulated according to plain information to be communicated.

At the receiver, upon detecting the signals, the time between consecutive transmissions of a specific transmitter is measured and analyzed. Assuming that the time period is $Tp=n*0.5\ sec \pm m*1\ msec$, wherein n and m are integers, and that $0<m<250$, then the receiver can calculate m, and consequently decode the transmitted plain information, by measuring the received Tp, and subtracting from the measured Tp the nearest number that is an integer multiple of 0.5 sec. That difference, in round milliseconds, is estimated by the receiver as m. The ±ambiguity associated with m can be solved by the sign of said subtraction result.

As a skilled person probably noted, a pseudo-random coarse resolution part of the transmission repetition period, as is preferably configured according to the first embodiment, i.e. $n*0.5$ sec, does not prevent the receiver from decoding the transmitted plain information, even if the specific nature of randomness of n is not known at the receiver.

According to the second embodiment of the present invention, an FDMA channel scheme is used, so referring to FIG. 5, the channel access parameter routed from the detector to the controller may be associated with the frequency of transmission, as detected at the receiver.

According to a third embodiment of the present invention, a CDMA channel scheme is used, and the parameter employed to convey plain information during the channel access is still the transmission time or transmission center frequency, so referring to FIG. 5, the channel access parameter routed from the detector to the controller may be associated with either the transmission timing or the transmission frequency.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for modulation of channel access parameters for communication of user information during physical channel acquisition, during which multiple transmitters access said channel, comprising the steps of:
   a. defining a channel access scheme and at least one parameter in said scheme;
   b. defining for said parameter a coarse resolution part in form of $N*\Delta$ and a fine resolution part in form of $n*\delta$, such that said parameter is equal to (N*Δ+n*δ) wherein N and n are integer numbers, Δ and δ are magnitudes of said parameter and Δ larger than n*δ;

c. independently configuring N according to said access scheme;
d. encoding n according to said user information;
e. accessing the channel employing said parameter.

2. The method of claim 1, comprising the additional steps of:
f. detecting a signal associated with said channel access parameter;
g. decoding said fine resolution part and accordingly determining said user information.

3. The method of claim 1, said access scheme at least one of: Time Division Multiple Access (TDMA), Frequency Division Multiple Access (FDMA), Code Division Multiple Access (CDMA), Space Division Multiple Access (SDMA).

4. The method of claim 1, said parameter associated at least with one of: transmission time, start of transmission time, time between transmissions, transmission frequency, transmission center frequency, transmission frequency band, spreading code, radiation directivity, radiation polarization.

5. The method of claim 1, further acquiring at least one of: position or time, from a Global Navigation Satellite System (GNSS), and associating said parameter therewith.

6. The method of claim 1, configuring the magnitude of said coarse resolution part randomly or pseudo-randomly.

7. A device for modulation of channel access parameters for transmission of user information during physical channel acquisition, during which multiple transmitters access said channel, comprising at least a transmitter coupled to controller, said transmitter configured to access the channel according to an access scheme, said controller configured to control at least one parameter of said access scheme, said parameter defined with a coarse resolution part in form of N*Δ plus a fine resolution part in form of n*δ such that N and n are integer numbers, Δ and δ are magnitudes of said parameter and Δ>n*δ, wherein said controller configured to independently configure N according to said access scheme, and encode n according to said user information, and said transmitter configured to access the channel employing said parameter.

8. The device of claim 7, said multiple access scheme at least one of: Time Division Multiple Access, Frequency Division Multiple Access, Code Division Multiple Access.

9. The device of claim 7, said parameter associated at least with one of: transmission time, start of transmission time, time between transmissions, transmission frequency, transmission center frequency, transmission frequency band, spreading code.

10. The device of claim 7, further comprising an antenna or antenna array, coupled to said transmitter and optionally also coupled to said controller, and said parameter associated with at least one of: radiation directivity or polarization.

11. The device of claim 7, comprising a GNSS receiver coupled to said controller, and said parameter associated with at least one of: time or position information acquired by said GNSS receiver.

12. The device of claim 11, wherein said fine resolution part associated with at least one of: timing information or position information acquired by said GNSS receiver.

13. The device of claim 7, being an Emergency Position Indicating Radio Beacon (EPIRB) or Personal Locator Beacon (PLB) or Emergency Locator Transmitter (ELT), configured to periodically transmit short bursts of data, wherein said parameter is associated with burst transmission time.

14. The device of claim 7, configured to periodically transmit a signal, said parameter being at least one of: the time period between transmissions, or the time of transmission.

15. The device of claim 7, the magnitude of said coarse resolution part configured randomly or pseudo-randomly.

16. A receiver for detection of user information communicated from a transmitter during physical channel acquisition, said receiver comprising at least a demodulator coupled to a controller, said demodulator configured to detect at least one pre-defined parameter of said channel access scheme in a received signal, said parameter configured to the sum of a coarse resolution part in form of N*Δ and a fine resolution part in form of n*δ wherein N and n are integer numbers, Δ and δ are magnitudes of said parameter and Δ>n*δ; and couple said detected parameter to said controller, said controller configured to independently determine n, and accordingly decode said user information.

17. The receiver of claim 16, said multiple access scheme at least one of: Time Division Multiple Access, Frequency Division Multiple Access, Code Division Multiple Access.

18. The receiver of claim 16, said parameter associated at least with one of: transmission time, start of transmission time, time between transmissions, transmission frequency, transmission center frequency, transmission frequency band, spreading code, radiation directivity, radiation polarization.

19. The receiver of claim 16, the magnitude of the coarse resolution part of said parameter configured randomly or pseudo-randomly.

20. The receiver of claim 16, further comprising a second GNSS receiver coupled to said controller, said receiver configured to determine at least one of: self location; the geographical location from where said signal was transmitted; the distance or direction to where said signal was transmitted from; the time at which said signal was transmitted or received.

* * * * *